Aug. 8, 1961  J. A. GILDER  2,995,226
REVERSE TORQUE LOCK MECHANISM
Filed May 7, 1959  2 Sheets-Sheet 1
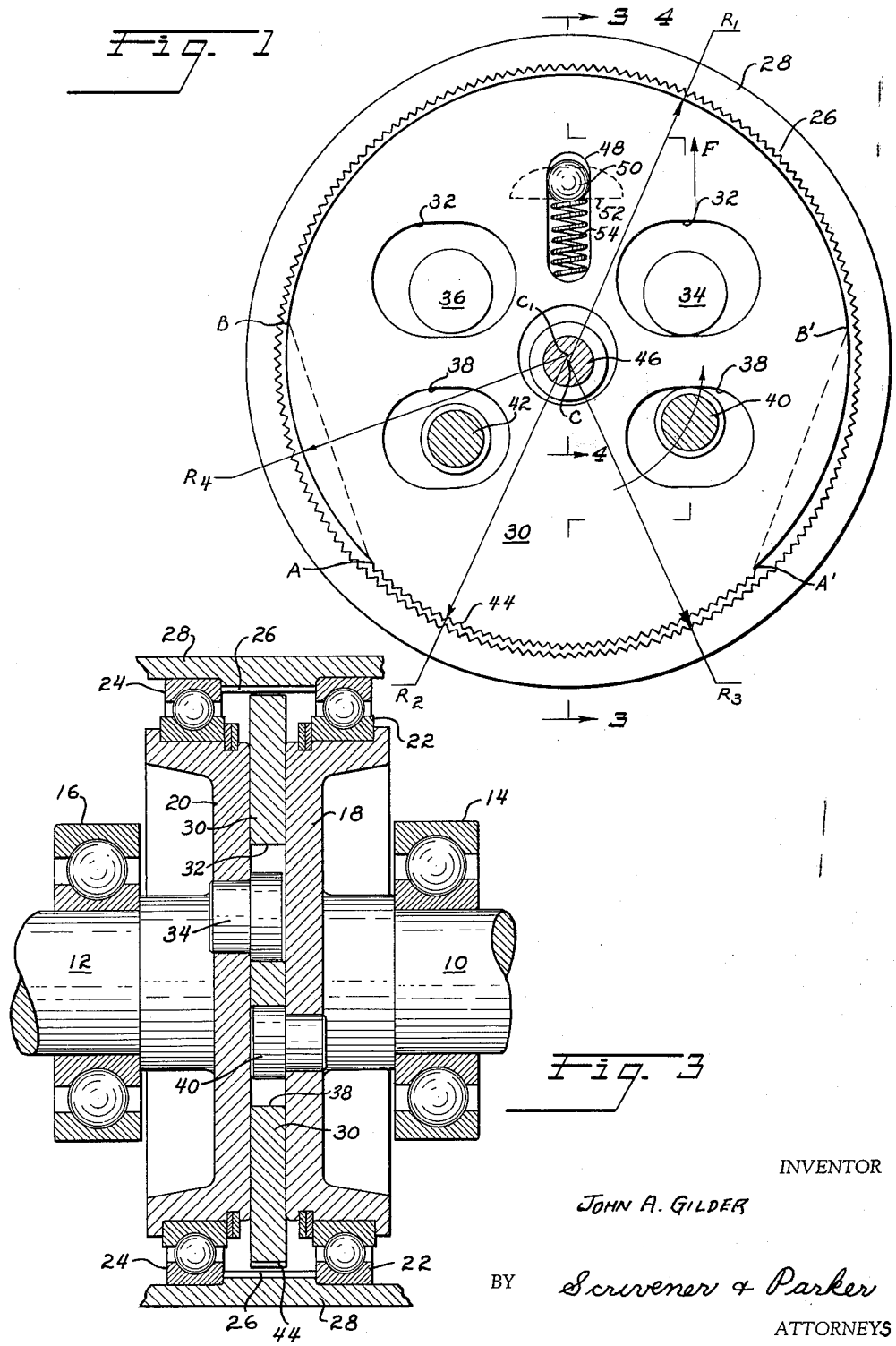
INVENTOR
JOHN A. GILDER
BY Scrivener & Parker
ATTORNEYS Aug. 8, 1961  J. A. GILDER  2,995,226
REVERSE TORQUE LOCK MECHANISM
Filed May 7, 1959  2 Sheets-Sheet 2
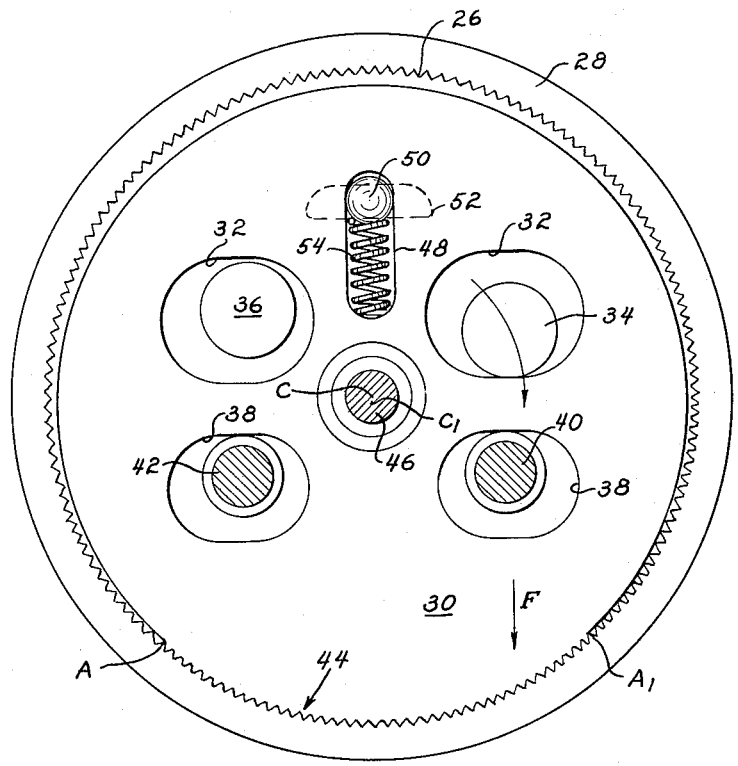
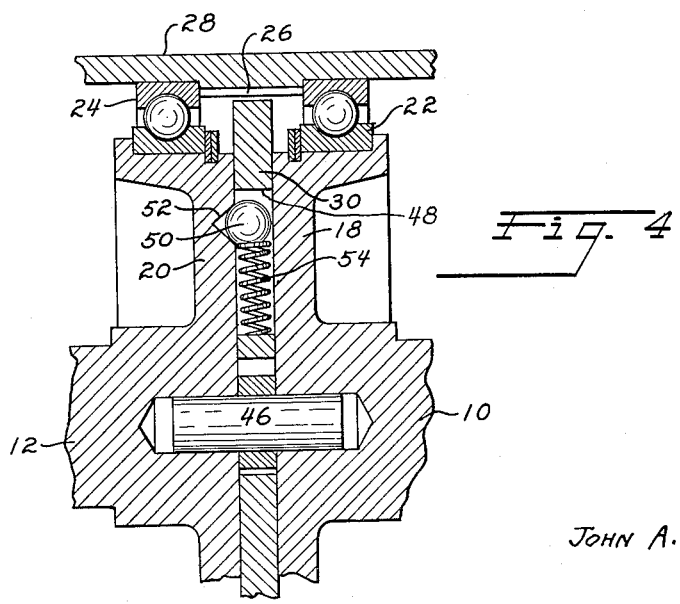
INVENTOR
JOHN A. GILDER
BY Scrivener + Parker
ATTORNEYS

United States Patent Office 2,995,226
Patented Aug. 8, 1961

2,995,226
REVERSE TORQUE LOCK MECHANISM
John A. Gilder, Los Angeles, Calif., assignor to Electrical Engineering & Manufacturing Corporation, Los Angeles, Calif., a corporation of California
Filed May 7, 1959, Ser. No. 811,661
2 Claims. (Cl. 192—8)

This invention relates to automatic locking means and more particularly to a reverse torque responsive lock mechanism to prevent a driven shaft from overriding a driving shaft.

In many types of rotating equipment, a device is required which will transmit a forward torque in either direction of rotation without appreciable losses and, in addition, lock against reverse torques in either direction of rotation to prevent the override of a driving member by a driven member.

Prior devices of this general type have employed reverse torque locks utilizing some form of wedging action as a means of accomplishing the desired result. The wedges used have been small parts, such as balls, rolls, or other specially shaped parts, working within the confines of a small angle and becoming locked or wedged within this small angle if a reverse torque is applied to the device with which they are associated. The efficiency of this wedging or locking action depends upon the value of the wedging angle with respect to the friction angle for the particular device involved, the wedging angle being less than the friction angle.

In wedging actions of this type, high unit loading occurs in the region of the wedging action which produces elastic deformation proportional to the load applied. As a result of this deformation, the wedging angle is changed so that as the load is increased, the wedging angle is also increased to a point where it becomes greater than the friction angle of the device and creates slip in the device. In order to overcome this difficulty, prior devices have of necessity been massive in proportion to the maximum torque which they are designed to hold against.

It is, therefore, a primary object of this invention to provide a reverse torque lock mechanism which is small in size as compared to the maximum value of torque opposed.

Another object of this invention is to provide a reverse torque lock mechanism which is free from slip.

Still another object of this invention is to provide a reverse torque lock mechanism which will operate without slip at all load points short of actual rupture and material breakdown.

Yet another object of this invention is to provide a reverse torque lock mechanism which is simple in construction and provides a maximum drive efficiency.

These and other objects of this invention will become apparent from the following specification and drawings which relate to a preferred embodiment of the invention.

In the drawings:

FIG. 1 is a front elevation of the invention in forward torque transmitting position;

FIG. 2 is a front elevation of the invention in reverse torque locked position;

FIG. 3 is a cross-section taken on line 3—3 of FIG. 1; and

FIG. 4 is a cross-section taken on line 4—4 of FIG. 1.

Referring in detail to the drawings and more particularly to FIG. 3, a driving member 10 is shown in cooperation with a driven member 12, both being shown in the drawings as rotatable shafts. Both the driving and driven members 10 and 12, respectively, are mounted in suitable journal bearings 14 and 16, respectively.

Each of the rotatable shafts 10 and 12 have enlarged integral end portions 18 and 20, respectively, thereon with flat opposed working faces with respect to one another. The enlarged end portions 18 and 20 are journalled in bearings 22 and 24, respectively.

The outer races of the journal bearings 22 and 24 are mounted one on either side of an internal ring gear track 26 on the inner periphery of a fixed outer lock member 28 which surrounds the enlarged end portions 18 and 20 of the driving and driven members 10 and 12, respectively.

A movable locking member 30 is located intermediate the flat opposed working faces of the enlarged end portions 18 and 20 of the driving and driven members 10 and 12, respectively.

Referring to FIG. 1 in conjunction with the description of FIG. 3, the movable locking member 30 is shown as a flat circular disk having a plurality of centrally located slots therein. One pair of slots, generally indicated at 32, are adapted to receive the enlarged bead portions of a pair of torque transmitting pins 34 and 36, respectively, which are fixedly mounted in the end face of the end portion 20 on the driven member 12, as shown in FIG. 3.

A second pair of slots, generally indicated at 38, are adapted to receive a pair of torque transmitting pins 40 and 42 which are mounted in the flat end face of the end portion 18 of the driving member 10, as shown in FIG. 3.

One segment of the periphery of the moving lock member 30 comprises a section of gear teeth 44 which are adapted to engage the adjacent gear track 26 on the inner periphery of the fixed lock member 28.

Referring to FIGS. 1 and 4, the moving lock member 30 is shown as being spring mounted for movement in a vertical direction about a central pilot pin 46 by means of an enlarged central slot 48 in the moving lock member 30 which cooperates with a ball detent 50. As shown in FIG. 4, the detent 50 is held in the end portion 20 of the driven member 12 by means of a V-notch 52 or the like. A compression spring 54 is mounted in the slot 48 between the ball detent 50 and the bottom of the slot. The resulting force tends to engage the section of gear teeth 44 on the outer periphery of the moving lock member 30 with the gear track 26 on the inner periphery of the fixed outer lock member 28.

In order to clearly describe the physical relationship between the moving lock member 30 and the fixed lock member 28, a pair of centers C and $C_1$ are located on the cross-section of the pilot pin 46 as shown in FIG. 1.

The back radius of the moving lock member 30 is indicated by $R_1$ with respect to the center C and is approximately equal to the internal radius of the gear track 26 on the fixed locking member 28. The portion of the surface of the moving lock member 30 having the value of back radius $R_1$ with respect to the center C is now able to rotate freely over the internal diameter of the gear track 26 on the fixed outer lock member 28.

The pitch radius of the gear teeth 44 on the outer periphery of the moving lock member 30 is taken with respect to the center $C_1$ and is shown on the drawings at $R_2$.

The center $C_1$ is displaced from the center C by an amount that will permit the gear teeth 44 on the moving lock member 30 to clear the teeth on the gear track 26 of the fixed lock member 28 at a point A.

The pitch radius of the fixed outer lock member 28 is taken with respect to center C and is shown on the drawings as $R_3$.

In order for the moving lock member 30 to function properly with respect to the outer fixed lock member 28, the peripheral arc of the moving lock member should have a radius such that the periphery is relieved between points A and B as shown in order to clear the teeth on the gear track 26 of the fixed lock member 28. One way of accomplishing this relief is by a change in radius $R_4$ with respect to the center $C_1$. Another means would be by the dotted line construction A—B, shown in FIG. 1. Points A′ and B′ shown in FIG. 1 on the opposite side of the moving lock member 30 define a similar region.

The surface described by the back radius $R_1$ should also be limited to less than 180° of arc in this embodiment to allow for the proper peripheral length of the gear teeth 44 and the relieved peripheral segment between points A and B.

The operation of this invention is described as follows in conjunction with FIGS. 1 and 2.

In FIG. 1, the reverse torque lock mechanism is shown in a forward torque transmitting position wherein the driving member 10 (not shown) is transferring torque to the driven member 12 (not shown). The driving torque transmitting pin 40 on the driving member 10 is shown in driving contact with the inner periphery of the associated slot 38 in the moving lock member 30. As a result, the moving lock member 30 is forced into driving contact with the torque receiving pin 34 on the driven member 12 at the inner periphery of its associated slot 32. Thus, the driven member 12 is driven by the driving member 10 in the direction shown by the arrow in FIG. 1 by the interaction of the driving pin 40 and driven pin 34 through means comprising the moving lock member 30 and the respective pin slots 38 and 32.

If the direction of rotation of the driving member is reversed from the direction shown, the torque transmitting pin 42 in the other of the pair of slots 38 will shift the moving lock member 30 into contact with the other torque receiving pin 36 in the other of the pair of slots 32 and the same forward torque transfer will be effected. The rotation of the moving lock member 30 in both cases is such that upper center $C_1$ describes a closed path about the center C.

In FIG. 2, the reverse torque lock mechanism is shown in locked position for the reverse torque case in which the driven member 12 tends to override the driving member 10 in the reverse direction shown.

The purpose of the spring 54 described above is to urge the moving lock member 30 in a direction to effect the meshing of the gear teeth 44 on the moving lock member 30, defined in FIG. 1 as being between points A and A′, with the gear teeth of the gear track 26 on the fixed lock member 28 at either of the points A or A′. Sufficient resistance against rotation acting in the direction of reverse torque produces a resultant force F shown in FIG. 2 which causes the gear teeth 44 on the moving lock member 30 to intermesh with the gear track 26 on the fixed lock member 28.

The spring 54 need only be strong enough to overcome forces such as gravity when the moving lock member 30 is oriented so that the meshing direction of the gear teeth 44 thereon is opposite to the force of gravity; and friction between the faces of the enlarged end members 18 and 20 of the driving and driven members 10 and 12, respectively, and the moving lock member 30.

Because the direction of force F resulting from the reverse torque is more radially directed than tangential, there will be no slip point due to the elastic deformation under load of the reverse torque lock mechanism. Thus, the maximum load torque is limited by the shear strength of the torque transmitting pins.

Referring in more detail to FIG. 2, it is seen that when a condition of reverse torque occurs, the driven torque receiving pin 34 tends to reverse its motion, as shown by the arrow, and the resulting force shifts the center $C_1$ of the moving lock member 30 to the center of the rotating system as shown. Thus, the gear teeth 44 on the moving lock member 30 are forced into meshing engagement with the gear track 26 on the fixed outer lock member 30 at either of the points A or A′, depending upon the direction of rotation, whereby the entire segment of gear teeth 44 is brought into contact with the gear track 26. The shift of the movable lock member 30 from the forward torque position of center $C_1$ to the reverse torque position thereof is accomplished by the combined efforts of the resultant reverse torque force F and the action of the compression spring 54.

Thus, it has been shown that for a reverse torque condition, the moving lock member 30 is locked to the fixed outer lock member 28, making reverse torque transfer from the driven member 12 to the driving member 10 impossible.

An example of the versatility of the reverse torque lock mechanism is as follows.

In a case where a power source is used to drive a shaft against a resisting torque load in both directions of rotation, an auxiliary manual drive must be provided to permit driving the shaft manually in the event of failure of the power source. In addition, the manual drive must be free to drive the load without overdriving the power source.

In this case, the fixed lock member 28 would be made free to rotate and coupled to the power source with the driven member 12 coupled to the output load. The driving member 10 in this case would be coupled to the manual drive.

With power applied to the outer lock member 28, the driving member 10 attached to the manual drive will also rotate but will induce no losses in the system since it is unloaded.

During manual operation, however, the manual drive and the driving member 10 are free of the power source and the reverse torque lock mechanism will proceed to function identically with the preceding description of operation to prevent the power source from being overdriven.

As can be seen from the above specification and drawings, this invention provides a strong, positive-acting reverse torque lock mechanism which will not slip throughout its operating range, the operating range being limited only by the breakdown strength of the materials used.

It is to be understood that the embodiment shown in the drawings and described in the specification is for the purpose of example only and is not intended to limit the scope of the appended claims.

I claim:

1. A reverse torque responsive lock mechanism comprising outer fixed lock means, driving means journalled within said outer lock means comprising a first shaft having an enlarged integral end portion with a flat end face thereon, torque transmitting means on said driving means comprising a first pair of pins fixed perpendicularly in said end face and offset to one side of the axis of rotation of said driving means, driven means in driven relationship with said driving means comprising a second shaft having an enlarged integral end portion with a flat end face thereon adjacent and parallel to the flat end face on the end of said first shaft, torque receiving means on said driven means comprising a second pair of pins fixed perpendicularly in said end face of said second shaft and offset to the opposite side of the axis of rotation of said driving means and said driven means from said first pair of pins, moving lock means internally mounted with respect to said fixed lock means located between said driving means and said driven means comprising a flat plate coextensive with said flat end faces on said shafts, means in said plate for individually receiving said torque transmitting and receiving pins whereby a driving connection is effected through said moving lock means, and means on the outer periphery of said moving lock means cooperating with means on the inner periphery of said fixed lock means when said torque receiving means acts to apply a reverse torque to said torque transmitting means, whereby said moving lock means is locked to said fixed lock means to prevent the transfer of reverse torque to said torque transmitting means and said driving means.

2. A reverse torque responsive lock mechanism comprising outer fixed lock means, driving means mounted for rotation within said fixed lock means comprising a first shaft having an enlarged integral end portion with a flat end face thereon, torque transmitting means on said driving means comprising a first pair of pins fixed perpendicularly in said end face and offset to one side of the axis of rotation of said driving means, driven means in driven relationship with said driving means about the same axis of rotation comprising a second shaft having an enlarged integral end portion with a flat end face thereon adjacent and parallel to the flat end face on the end of said first shaft, torque receiving means on said driven means comprising a second pair of pins fixed perpendicularly in said end face of said second shaft and offset to the opposite side of the axis of rotation of said driving means and said driven means from said first pair of pins, moving lock means internally mounted with respect to said fixed lock means located between said driving means and said driven means and interconnected with said torque transmitting means and said torque receiving means whereby driving torques may be transmitted between said driving means and said driven means comprising a flat plate coextensive with said working faces and having means therein for individually receiving said torque transmitting and receiving pins, first and second positions for said moving lock means with respect to said axis of rotation, biasing means on said moving lock means for biasing same toward said second position, said biasing means including an elongated radial slot in said moving lock means, a recessed detent in one of said working faces of said shafts extending perpendicular to the radial axis of said elongated slot within the outer limits thereof, a ball detent greater in diameter than the thickness of said flat plate in said moving lock means held in said recessed detent and said radial slot by means of its own relative dimensions thereto, and a coil spring compressed between said ball detent and the inner boundary of said elongated radial slot whereby said flat plate is biased radially inward from said ball detent, said moving lock means acting about said first position against the action of said biasing means when transmitting a forward torque from said driving means to said driven means and shifting to said second position enhanced by the action of said biasing means when said driven means tends to impart a reverse torque to said driving means.

References Cited in the file of this patent

UNITED STATES PATENTS

| | | |
|---|---|---|
| 1,718,426 | Hokanson et al. | June 25, 1929 |
| 2,223,217 | Little | Nov. 26, 1940 |
| 2,447,167 | Davis et al. | Aug. 17, 1948 |
| 2,873,832 | Helm | Feb. 17, 1959 |

FOREIGN PATENTS

| | | |
|---|---|---|
| 332,755 | Italy | Dec. 7, 1935 |